United States Patent [19]

Uemura et al.

[11] Patent Number: 5,134,036
[45] Date of Patent: Jul. 28, 1992

[54] ETHYLENE-VINYL ALCOHOL COPOLYMERS, MOLDINGS AND LAMINATES

[75] Inventors: Junichi Uemura; Akimasa Aoyama; Hitoshi Maruyama; Toshiaki Sato, all of Kurashiki; Takuji Okaya, Osaka, all of Japan

[73] Assignee: Kuraray Co., Ltd., Kurashiki, Japan

[21] Appl. No.: 697,450

[22] Filed: May 9, 1991

[30] Foreign Application Priority Data

May 15, 1990 [JP] Japan .................................. 2-125963
Aug. 29, 1990 [JP] Japan .................................. 2-229028

[51] Int. Cl.$^5$ .................................................. B32B 27/08
[52] U.S. Cl. ....................................... 428/516; 428/500; 428/522; 428/515; 428/523; 525/60
[58] Field of Search ............... 525/60; 428/516, 500, 428/522, 523, 515

[56] References Cited

U.S. PATENT DOCUMENTS

| | | | |
|---|---|---|---|
| 3,595,740 | 7/1971 | Gerow | 161/254 |
| 4,500,677 | 2/1985 | Maruhashi | 525/60 |
| 4,590,131 | 3/1986 | Yazaki et al. | 525/60 |
| 4,719,259 | 1/1988 | Jenkins | 525/60 |
| 4,904,723 | 2/1990 | Uemura et al. | 525/60 |
| 4,921,907 | 5/1990 | Negi et al. | 525/60 |
| 4,931,500 | 6/1990 | Okamoto et al. | 525/60 |
| 4,977,212 | 12/1990 | Akazawa et al. | 525/60 |

FOREIGN PATENT DOCUMENTS

| | | | |
|---|---|---|---|
| 363813 | 4/1990 | European Pat. Off. . | |
| 389833 | 10/1990 | European Pat. Off. . | |
| 108713 | 5/1986 | Japan . | |
| 319505 | 12/1989 | Japan . | |
| 1165486 | 10/1969 | United Kingdom | 525/60 |
| 190018 | 4/1970 | United Kingdom . | |

OTHER PUBLICATIONS

Journal of Polymer Science, Polymer Chemistry Ed. vol. 26, No. 7, Jul. 1988 pp.1961-1968, K. Imai et al.

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

Ethylene-vinyl alcohol copolymers wherein ethylene content is 10-70 mol % diad syndiotacticity is not less than 55 mol %, and intrinsic viscosity [$\eta$] is not less than 0.05 l/g when measured with a mixed solvent of 85 weight % of phenol and 15 weight % of water at 30 20 C., which show less decrease of resistance to gas permeation under high temperature and high humidity, while retaining resistance to get permeation under low humidity, transparency and melt moldability, and moldings and laminates formed thereof.

7 Claims, 1 Drawing Sheet

ETHYLENE-VINYL ALCOHOL COPOLYMERS, MOLDINGS AND LAMINATES

BACKGROUND OF THE INVENTION

The present invention relates to ethylene-vinyl alcohol copolymers having high syndiotacticity, to moldings and to laminates.

Ethylene-vinyl alcohol copolymer (hereinafter abbreviated as EVOH) is a thermoplastic resin having excellent resistance to gas permeation, oil and solvent, and perfume retention, which is used for various packages, sheets, containers and so on.

EVOH is obtained by saponification of ethylene-vinyl acetate copolymer obtained by the solution polymerization method. However, EVOH obtained as described shows drastic change of impact-resistance and Young's modulus according to external moisture and temperature, and also high moisture-dependency of its resistance to gas permeation. While laminates comprising EVOH as an intermediate layer have recently been used for containers for retorting, EVOH shows decrease of resistance to gas permeation upon retorting.

SUMMARY OF THE INVENTION

The present invention is aimed at reducing decrease of resistance to gas permeation observed in conventional EVOH under high humidity conditions, particularly under high temperature and high humidity conditions.

The present inventors have conducted intensive studies, and as a result, found that increased syndiotacticity results in avoiding decrease of resistance to gas permeation under high humidity conditions, particularly under high temperature and high humidity conditions without causing impairment of excellent properties of conventional EVOH, which resulted in completion of the invention.

DETAILED DESCRIPTION OF THE INVENTION

Figure 1:
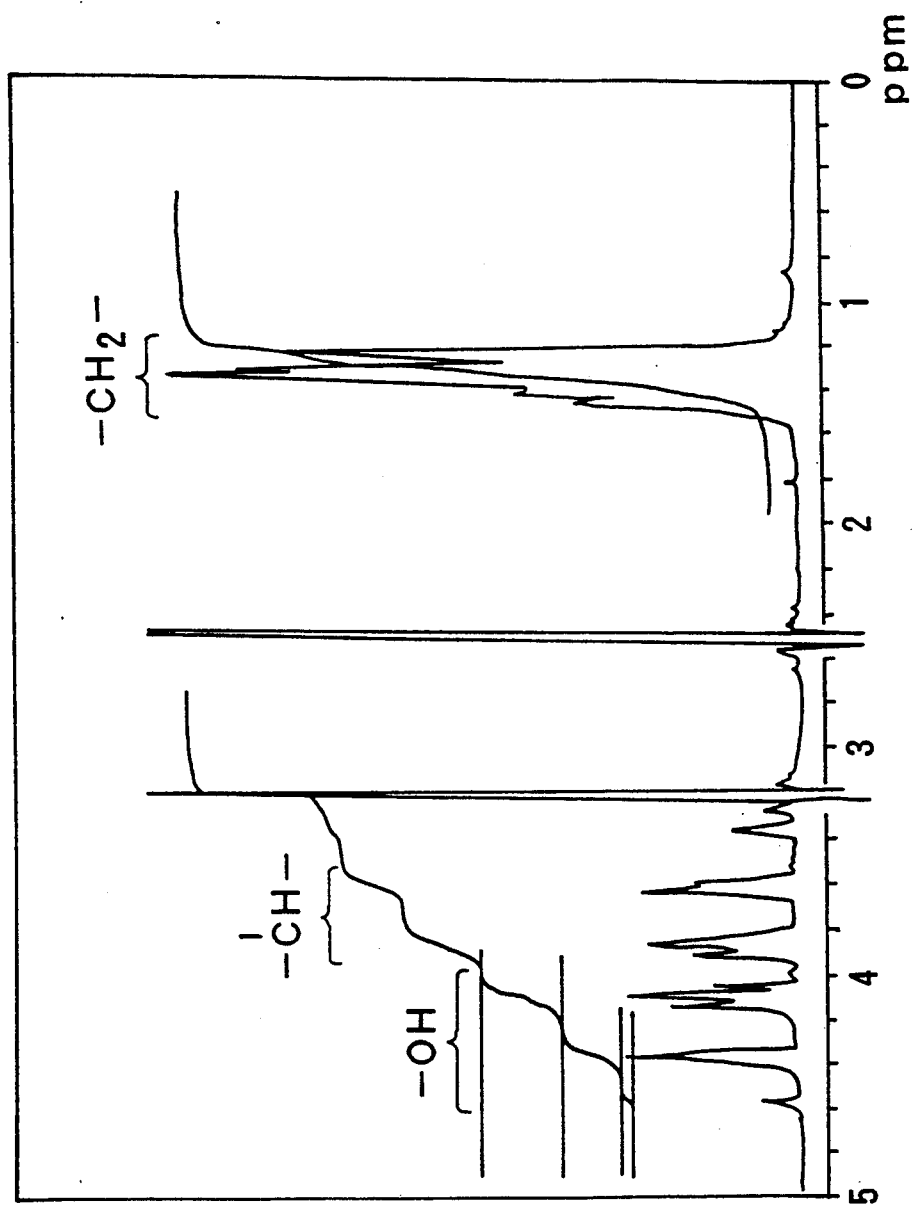
FIG. 1 is a chart of $^1$H-NMR of the ethylene-vinyl alcohol random copolymer obtained in Example 1 which was measured by GX-400 (Nippon Denshi Co., 400 MHz) in $d_6$-DMSO, wherein peaks at 1.2–1.5 ppm show chemical shift of methylene group, those at 3.5–4.0 ppm show chemical shift of methine group and those at 4.0–4.7 ppm show chemical shift of hydroxyl group.

The present invention relates to ethylene-vinyl alcohol copolymers wherein ethylene component content is 10–70 mol %, syndiotacticity is not less than 55 mol % by diad convention, and intrinsic viscosity $[\eta]$ is not less than 0.05 l/g when measured with a mixed solvent of 85 weight % of phenol and 15 weight % of water at 30° C.

In the present invention, it is primarily necessary that ethylene component be contained in a ratio of 10–70 mol %, at which ratio superior resistance to gas permeation under high humidity conditions, particularly under high temperature and high humidity conditions can be maintained. When the ethylene component is contained in a ratio of less than 10 mol %, resistance to gas permeation under high humidity conditions cannot be sustained, and when it is contained in a ratio of more than 70 mol %, resistance to gas permeation under low humidity conditions is markedly impaired. The ethylene content is preferably not less than 15 mol %, more preferably not less than 20 mol %, most preferably not less than 25 mol %, and preferably not more than 65 mol %, more preferably not more than 60 mol %.

In the present invention, it is extremely important that syndiotacticity be not less than 55 mol %, at which level superior resistance to gas permeation under high humidity conditions, particularly under high temperature and high humidity conditions can be maintained. Syndiotacticity of less than 55 mol % leads to impairment of resistance to gas permeation under high humidity conditions, as can be seen from Examples to be described below. Syndiotacticity is preferably not less than 57 mol %. The upper limit thereof is not particularly limited, but it is preferably 65 mol % or 70 mol % from the aspect of production facility.

Syndiotacticity is normally expressed by diad convention and is calculated by the integrated intensity ratio of split peaks assigned to hydrogen atoms of hydroxyl groups at 4.0–4.7 ppm of $^1$H-NMR (See FIG. 1).

Intrinsic viscosity $[\eta]$ of the ethylene-vinyl alcohol copolymers of the invention is not less than 0.05 l/g, at which level moldings with sufficient mechanical strength and good melt moldability can be obtained. It is preferably 0.05–0.7 l/g and more preferably 0.06–0.5 l/g.

The ethylene-vinyl alcohol copolymers of the invention can be produced, for example, by the following method which comprises copolymerization of ethylene and a vinyl ester of the formula (I), followed by saponification of the copolymer thus obtained.

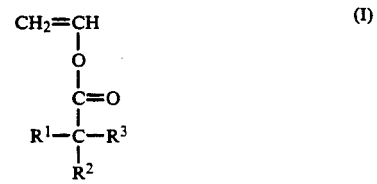

wherein $R^1$ and $R^2$ are hydrogen or hydrocarbon and $R^3$ is hydrocarbon. Examples of hydrocarbon include those having 1 to 18 carbon atoms such as lower alkyl (e.g. methyl, ethyl, propyl, butyl, t-butyl), aryl (e.g. phenyl) and cycloalkyl (e.g. cyclohexyl). $R^1$, $R^2$ and $R^3$ are preferably lower alkyl, particularly methyl. That is, as the vinyl ester component, preferred is vinyl pivalate wherein $R^1$, $R^2$ and $R^3$ are methyl.

The polymerization of ethylene-vinyl ester is carried out by bulk polymerization, solution polymerization, suspension polymerization or emulsion polymerization, with preference given to solution polymerization in the presence of bulk or a solvent at a temperature between 0° C. and 100° C., preferably between 30° C. and 60° C. The rate of polymerization is 20–80%, preferably 30–60%, and the concentration of a solvent in the solution polymerization is not more than 50%, preferably not more than 30%.

The solvent used for the solution polymerization is preferably an alcohol, and lower alcohols such as methanol, ethanol, propanol and t-butanol are used solely or in combination. The polymerization can be conducted batch-wise or continuously, with preference given to flow operation using a stirring-mixing polymerization tank.

The ethylene content in the ethylene-vinyl ester copolymers is determined by amounts of vinyl ester in the system and ethylene dissolved in the solution, the latter depending on ethylene pressure and temperature in the system. It is well known in batch polymerization that the copolymerization composition varies along with the rate of polymerization according to the copolymerization reactivity ratio. Thus, adoption of the semi-batch method wherein one or both of monomers is(are) added for maintaining a constant monomer composition is desirable for production of copolymer having a homogeneous copolymerization composition. Examples of the calculation method for amounts to be added include the formula presented by R. J. Hanna [Industrial and Engineering Chemistry, vol. 49, 208 (1957)]. Where the continuous method is employed, one-step flow reaction system of complete mixing type using a stirring-mixing tank as a copolymerization tank is preferable. In the case of multi-step flow reaction system using 2 steps or more, addition of monomer(s) to the tank of the second and subsequent steps is desirable for keeping a constant monomer composition in the copolymerization tank in each step for the same reason described above.

A radical polymerization initiator is used in the above-mentioned copolymerization and examples thereof include nitriles such as 2,2'-azobis-(4-methoxy-2,4-dimethylvaleronitrile), 2,4,4-trimethylvaleronitrile and 2,2'-azobis-isobutyronitrile, carbonates such as di-n-propylperoxycarbonate, bis-4-t-butylcyclohexylperoxydicarbonate and bis-2-ethyl-hexylperoxydicarbonate and peroxides such as acetyl cyclohexanesulfonyl peroxide, benzoyl peroxide and lauroyl peroxide. The copolymer thus obtained is then subjected to saponification.

In general, vinyl esters having a bulky group on the side chain as shown in formula (I) above, such as vinyl pivalate are barely hydrolyzed due to the steric hindrance, and alkali saponification of ethylene copolymers of said vinyl esters under the conditions usually employed for ethylene-vinyl acetate copolymer results in insufficient saponification. For this reason, saponification under the following conditions is desirable.

It is primarily important that the saponification be carried out in the absence of oxygen or in the presence of an antioxidant. Further, it is important that the molar ratio of basic substance/vinyl ester unit content be 0.1-10 and the saponification temperature be 60° C. or above.

The absence of oxygen is achieved by replacement thereof with an innert gas such as nitrogen. The antioxidant is not particularly limited as long as it does not act adversely to the saponification reaction and does not cause a loss of antioxidant action in the saponification system, and is representatively exemplified by, for example, hindered phenol antioxidants such as compounds of the formula

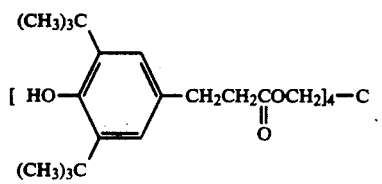

[IRGANOX 1010 (Japan Ciba Geigy)] and compounds of the formula

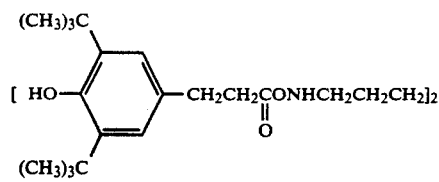

[IRGANOX 1098 (Japan Ciba Geigy)], phenolic antioxidants such as hydroquinone and hindered amine antioxidants such as SANOL LS-770 (Japan Ciba Geigy).

The saponification is carried out in the presence of a basic substance, and either transesterification or direct saponification can be employed depending on the kind of the basic substance, concentration and the kind of solvents. Examples of the basic substance include strong bases such as sodium hydroxide, potassium hydroxide and calcium hydroxide, and metal alkoxides such as sodium methoxide, sodium ethoxide, potassium methoxide, potassium ethoxide and potassium-t-butoxide. The molar ratio of the base substance/vinyl ester unit content is expressed by the molar ratio relative to the vinyl ester unit in the copolymer, which is 0.1-10, preferably 0.5-3. These values vary according to the objective degree of saponification, polymerization degree, and the kind of solvent and basic substance. Generally, the molar ratio of less than 0.1 does not increase degree of saponification, while that of more than 10 induces remarkable decrease of polymerization degree during saponification. The amount of the basic substance is determined assuming compensation of amounts to be consumed when containing a group reactive with the basic substance, such as carboxyl group in monomer unit other than the copolymer, or an antioxidant reactive with the basic substance.

The saponification temperature is not less than 60° C., preferably 60°-140° C., more preferably 80°-120° C.

The saponification time is adequately determined according to the objective degree of saponification, concentration of polymer, solvent, basic substance, temperature, and the like. The residual basic substance in the reaction system is neutralized with an acid immediately following termination of the saponification. Examples of the acid include inorganic acids such as hydrochloric acid, sulfuric acid, nitric acid, phosphoric acid and carbonic acid, and organic acids such as formic acid, acetic acid and benzoic acid, with preference given to organic acids, particularly acetic acid. If the residual basic substance in the reaction system is not neutralized after the saponification, decrease of polymerization degree of the copolymer occurs.

The solvent to be used in the saponification dissolves or imbibes the ethylene-vinyl ester copolymer, and preferred are those capable of dissolving the basic substance and the copolymer after the saponification. As such solvents, mention can be made of cyclic ethers such as tetrahydrofuran and dioxane, ketones such as acetone, methyl ethyl ketone and methyl isobutyl ketone, sulfoxides such as dimethyl sulfoxide, amides such as dimethylformamide, aromatic hydrocarbons such as toluene and benzene, and alcohols such as methanol, ethanol, t-butanol, n-propanol, iso-propanol, sec-butanol and cyclohexanol, with preference given to tetrahydrofuran, methyl ethyl ketone and t-butanol, which can be used solely or in combination.

The concentration of the ethylene-vinyl ester copolymer in the solvent solution in the saponification system is determined according to the degree of polymerization of the copolymer, which is normally between 3 weight % and 70 weight %.

The degree of saponification of the vinyl ester of the formula (I) in the ethylene-vinyl alcohol copolymer thus obtained by saponification according to the method as described is not less than 80 mol %, preferably not less than 98 mol %, most preferably not less than 99%. The higher the degree of saponification, the better the resistance to gas permeation. The ethylene-vinyl alcohol copolymers of the invention may contain a comonomer other than ethylene and those of the aforementioned formula (I), such as $\alpha$-olefin (e.g. propylene, isobutene), an olefin unsaturated monomer containing silicon, unsaturated carboxylic acid such as acrylic acid, methacrylic acid and maleic acid or their salt or ester, and vinyl acetate, as a copolymerizable component as long as it does not impair the object of the present invention.

The thus-obtained ethylene-vinyl alcohol copolymers particularly show marked improvements in reducing decrease of resistance to gas permeation under high humidity conditions, particularly under high temperature and high humidity conditions in comparison with conventional EVOH as described in Examples below, and thus are highly applicable to the fields where resistance to gas permeation under high humidity conditions is required, such as for packages for foods, particularly liquid (e.g. containers, cups, pouches, etc.), specifically for packages for retorts which are processed under high temperature and high humidity conditions. Moreover, the ethylene-vinyl alcohol copolymers of the invention are comparable to conventional EVOH in resistance to gas permeation under low humidity conditions (dry state), mechanical properties (Young's modulus, tensile strength, tensile elongation at break, etc.) and transparency, and show good melt moldability when ethylene is contained at the ratio of not less than 15 mol %, particularly not less than 20 mol %.

The ethylene-vinyl alcohol copolymers of the invention can be applied to a wide range of use such as moldings, paint and varnish, adhesives, and the like. Among others, they can be widely applied to moldings, particularly packages for foods, pharmaceuticals, cosmetics, or the like. As the moldings, mention can be made of films and sheets produced by melt molding, those obtained by stretching (monoaxial or biaxial stretching) the films and the sheets accompanied by heat treatment, if necessary, parisons, pipes, containers such as bottles (e.g. direct blow bottle, biaxial stretching blow bottle) and cups by thermoforming, fibers such as composite fibers containing the ethylene-vinyl alcohol copolymers of the invention as one component, or the like.

The other mode of the invention is directed to provision of laminates containing at least two layers of an ethylene-vinyl alcohol copolymer layer and a thermoplastic resin layer in an attempt to meet demands for diversification of characteristics, sophistication, etc. which are prominent in recent years. As the thermoplastic resin to be used for laminating with the ethylene-vinyl alcohol copolymer of the invention, preferred are polyolefin resins such as polyethylene, polypropylene, ethylene-propylene copolymer and ethylene-vinyl acetate copolymer, thermoplastic polyesters such as polyethylene terephthalate, polyamides such as 6-nylon and 66-nylon, polystyrene, poly(vinyl chloride), polycarbonate, conventional EVOH, poly(vinyl alcohol) and two or more of these in mixture. Among these, particularly preferred are thermoplastic resins which show low vapor permeability such as polyethylene, polypropylene, ethylene-propylene-copolymer, thermoplastic polyester, polystyrene and polycarbonate. The structure of the laminates is ethylene-vinyl alcohol copolymer of the invention/thermoplastic resin, thermoplastic resin/ethylene-vinyl alcohol copolymer of the invention/thermoplastic resin, thermoplastic resin/ethylene-vinyl alcohol copolymer of the invention/thermoplastic resin/ethylene-vinyl alcohol copolymer of the invention/thermoplastic resin, or the like, and the ethylene-vinyl alcohol copolymer of the invention and the thermoplastic resin may be single-ply or multi-ply.

Where necessary, an adhesive resin may be contained between each layer of the laminates, and no limitation is posed on the adhesive resin. Preferred are polyethylene, polypropylene, ethylene-vinyl acetate copolymer, ethylene-acrylate copolymer, etc. modified with ethylene type unsaturated acid or its anhydride, with preference given to those modified with maleic anhydride and a blend of those modified with maleic anhydride and those unmodified.

A known method such as extrusion molding and injection molding is mainly employed for molding the laminates. For example, multi.composite T-die extrusion molding, inflation molding, blow molding, biaxial stretching molding or the like may be employed as the extrusion molding method. Also, the laminates can be formed by laminating techniques such as extrusion laminating and dry laminating, or coating techniques. As a base used for laminating and coating, films and sheets made of cellophane, poly(vinylidene chloride), etc. which may be monoaxially or biaxially stretched, or a composite thereof, paper, etc. may be used besides films and sheets made of the aforementioned thermoplastic resins used for laminating with the ethylene-vinyl alcohol copolymers of the invention. The moldings and laminates formed of the ethylene-vinyl alcohol copolymers of the invention may have a metal oxide (deposit) layer.

It is also possible to add suitable amounts of plasticizers, stabilizers, surfactants, cross-linking agents, fillers, enforcing fibers and other thermoplastic resins to EVOH of the invention during melt molding. As the thermoplastic resins, there may be mentioned those used for laminating with the saponified copolymer of the invention.

The laminates formed into films, sheets, parisons and pipes by extrusion molding, injection molding, etc. as described can be used as a material for nonstretched or stretched (monoaxial or biaxial) laminate films, deep draw containers, direct blow containers and biaxially stretched blow containers. Deep draw containers such as cups can be obtained by deep drawing, air-pressure forming, vacuum forming, plug-assist forming, etc. of a sheet of said laminates at a predetermined stretching temperature. The thus-obtained laminates, the detail of which is to be discussed in Examples, show small oxygen permeability under high humidity and are suitably used for packages, particularly for foods.

The present invention is further described in the following by illustrating working examples, to which the invention is not limited.

EXAMPLE 1

In a 50-1 pressure-resistant polymerization tank with a stirrer were charged vinyl pivalate monomer (20 kg), methanol (4.5 kg), ethanol (1.5 kg) and azobisisobutylonitrile (AIBN, 13 g) as a polymerization initiator, and oxygen was removed by ethylene replacement in the system. Ethylene pressure was kept at 25 kg/cm$^2$, and polymerization was conducted at 60° C. for 5 hours while stirring. A polymerization inhibitor was quickly thrown into the system to terminate the polymerization. The rate of polymerization of the vinyl pivalate was 50%. The copolymer was dissolved in iso-propanol, and the solution was heated under reduced pressure to displace unreacted monomer. Acetone was added for reprecipitation and purification. Six kg of the polymer was dissolved in tetrahydrofuran (THF, 90 kg), followed by nitrogen bubbling for 1 hour to completely remove oxygen. Further, potassium hydroxide (KOH, 15.6 kg) (molar ratio of KOH/vinyl pivalate unit: 6.5) was dissolved in methanol (MeOH, 45 kg), followed by nitrogen bubbling in the same way for 1 hour to remove oxygen. The both solutions were charged in a nitrogen-replaced 200-1 pressure-resistant reaction tank and thoroughly mixed, after which the mixture was subjected to saponification at 95° C. for 75 minutes. The saponified compound was washed with pure water and dried under reduced pressure at 105° C. for 20 hours. The ethylene-vinyl alcohol random copolymer obtained was examined for ethylene component content, degree of saponification and syndiotacticity by $^1$H-NMR using d$_6$-dimethyl sulfoxide (DMSO) as a solvent. The $^1$H-NMR chart is shown in FIG. 1. The melting point was measured with the use of DSC by elevating the temperature at a rate of 10° C./min. from room temperature to 250° C., then rapidly cooling to room temperature and elevating to 250° C. again at the same rate in a nitrogen stream.

Oxygen permeability upon retorting was estimated by subjecting a cup (bottom 66 mm$\phi$, top 75 mm$\phi$, height 75 mm; surface area (permeation area)/volume=0.7) of draw ratio 1:1 formed of a multi-layer sheet [3 kinds 5-layered sheet of polypropylene (PP)/adhesive layer/copolymer of Example 1/adhesive layer/PP having thickness constitution of PP (300µ)/adhesive layer (15µ)/copolymer (20µ)/adhesive layer (15µ)/PP (300µ) prepared by coextrusion], which was filled with a solution prepared by adding a reduction solution to water from which oxygen had been sufficiently removed, and the top of which was sealed with aluminum foil, to retorting at 120° C. (gauge pressure 1.0 kg/cm$^2$) for a predetermined time, sampling the solution in the cup, and measuring absorbance of a reaction product of the reduction solution and permeated oxygen.

Oxygen permeation was examined by heat treating a 30 µ-thick melt extruded monolayer film at 120° C. for 10 minutes, keeping same in 65% RH and 100% RH at 20° C. for a week while maintaining the humidity, and measuring same by an oxygen transmission measurement device (OX-TRAN 100, Modern Control Corp.).

Young's modulus, tensile strength and tensile elongation at break were measured by a tensile machine at a stress rate of 500 mm/min. using a monolayer film as described, after heat treating same at 120° C. for 10 minutes and keeping same in 65% RH at 20° C. for a week while maintaining the humidity.

The measurement results are summarized in Table 1.

EXAMPLE 2

Polymerization, saponification, washing and drying were conducted in the same manner as in Example 1 except that ethylene pressure was set for 34 kg/cm$^2$, and various analyses of EVOH and various evaluation of a cup and a monolayer film obtained by forming the EVOH as in Example 1 were made. The results are summarized in Table 1.

EXAMPLE 3

Polymerization, saponification, washing and drying were conducted in the same manner as in Example 1 except that methanol was used in an amount of 2.4 kg and ethylene pressure was set for 45 kg/cm$^2$, and various analyses of EVOH and various evaluation of a cup and a monolayer film obtained by forming the EVOH as in Example 1 were made. The results are summarized in Table 1.

EXAMPLE 4

Polymerization, saponification, washing and drying were conducted in the same manner as in Example 1 except that methanol was used in an amount of 6.0 kg and ethylene pressure was set for 15 kg/cm$^2$, and various analyses of EVOH and various evaluation of a cup and a monolayer film obtained by forming the EVOH as in Example 1 were made. The results are summarized in Table 1.

COMPARATIVE EXAMPLE 1

In a 50-1 pressure-resistant polymerization tank with a stirrer were charged vinyl acetate monomer (13 kg), methanol (2.0 kg) and azobisisobutylonitrile (AIBN, 8.8 g) as a polymerization initiator, and oxygen was sufficiently removed by ethylene replacement in the system. Ethylene pressure was kept at 42 kg/cm$^2$, and polymerization was conducted at 60° C. for 4 hours while stirring. A polymerization inhibitor was quickly thrown into the system to terminate the polymerization. The rate of polymerization of the vinyl acetate was 40%. Methanol was added to displace unreacted monomer, after which predetermined amounts of sodium hydroxide (NaOH) and methanol were added and saponification was conducted at 60° C. for 75 minutes, followed by washing and drying. Various analyses of EVOH and various evaluation of a cup and a monolayer film obtained by forming the EVOH as in Example 1 were made. The results are summarized in Table 1. Oxygen permeability upon 120° C. retorting and oxygen permeation upon 100% RH, 20° C. treatment are higher than in Example 1.

COMPARATIVE EXAMPLE 2

Polymerization, saponification, washing and drying were conducted in the same manner as in Comparative Example 1 except that ethylene pressure was set for 57 kg/cm$^2$, and various analyses of EVOH and various evaluation of a cup and a monolayer film obtained by forming the EVOH as in Example 1 were made. The results are summarized in Table 1. Oxygen permeability upon 120° C. retorting and oxygen permeation upon 100% RH, 20° C. treatment are higher than in Example 3.

COMPARATIVE EXAMPLE 3

Polymerization, saponification, washing and drying were conducted in the same manner as in Example 1 except that the saponification was conducted at 60° C. for 30 minutes, and various analyses of EVOH and various evaluation of a cup and a monolayer film obtained by forming the EVOH as in Example 1 were made. The results are summarized in Table 1. Oxygen permeability upon 120° C. retorting and oxygen permeation upon 65% RH and 100% RH, 20° C. treatments are markedly higher than in Example 1.

COMPARATIVE EXAMPLE 4

Polymerization, saponification, washing and drying were conducted in the same manner as in Comparative Example 1 except that methanol was used in an amount of 3.3 kg and ethylene pressure was set for 18 kg/cm², and various analyses of EVOH and various evaluation of a cup and a monolayer film obtained by forming the EVOH as in Example 1 were made. The results are summarized in Table 1. Oxygen permeability upon 120° C. retorting and oxygen permeation upon 100% RH, 20° C. treatment are higher than in Example 4.

COMPARATIVE EXAMPLE 5

Polymerization, saponification, washing and drying were conducted in the same manner as in Example 1 except that methanol was not used and ethylene pressure was set for 80 kg/cm², and various analyses of EVOH and various evaluation of a cup and a monolayer film obtained by forming the EVOH as in Example 1 were made. The results are summarized in Table 1. Oxygen permeability upon 120° C. retorting and oxygen permeation upon 65% RH and 100% RH, 20° C. treatments are markedly higher than in Examples 1–4.

COMPARATIVE EXAMPLE 6

Polymerization, saponification, washing and drying were conducted in the same manner as in Example 1 except that methanol was used in an amount of 10.0 kg, ethanol was used in an amount of 1.0 kg and ethylene pressure was set for 3 kg/cm², and various analyses of EVOH were made. Since melt molding was unapplicable to the EVOH due to its high melting point, it was dissolved in DMSO, from which a film (30μ) was formed by the cast method. The results of various evaluation of the film are summarized in Table 1.

COMPARATIVE EXAMPLE 7

Polymerization, saponification, washing and drying were conducted in the same manner as in Example 1 except that methanol was used in an amount of 8.0 kg, ethanol was not used and ethylene pressure was set for 0 kg/cm² (no use of ethylene). Since melt thermoforming was unapplicable to the polymer obtained due to its high melting point, it was dissolved in DMSO, from which a film (30μ) was formed by the cast method. The results of various evaluation of the film are summarized in Table 1. Oxygen permeation under high humidity is markedly higher than in Examples 1–4.

TABLE 1

| | Ethylene component content (mol %) | Saponification degree (mol %) | Saponification temp. (°C.) | Saponification time (min.) | $[\eta]$ (l/g) | Melting point (°C.) | Syndiotacticity (mol %) |
|---|---|---|---|---|---|---|---|
| Example 1 | 32 | 99.7 | 95 | 75 | 0.116 | 186 | 60 |
| Example 2 | 40 | 99.3 | 95 | 75 | 0.103 | 170 | 59 |
| Example 3 | 44 | 99.1 | 95 | 75 | 0.126 | 164 | 60 |
| Example 4 | 25 | 99.7 | 95 | 75 | 0.115 | 189 | 61 |
| Comp. Ex. 1 | 32 | 99.6 | 95 | 75 | 0.100 | 183 | 52 |
| Comp. Ex. 2 | 44 | 99.2 | 95 | 75 | 0.091 | 165 | 52 |
| Comp. Ex. 3 | 32 | 76.2 | 60 | 30 | 0.113 | — | 60 |
| Comp. Ex. 4 | 20 | 99.8 | 60 | 75 | 0.121 | 202 | 51 |
| Comp. Ex. 5 | 71 | 99.6 | 95 | 75 | 0.088 | 124 | 59 |
| Comp. Ex. 6 | 5 | 99.9 | 95 | 75 | 0.142 | 243 | 62 |
| Comp. Ex. 7 | 0 | 99.8 | 95 | 75 | 0.197 | 254 | 61 |

| | Oxygen permeability upon retorting (ppm) 60 min. | Oxygen permeability upon retorting (ppm) 120 min. | Oxygen permeation (cc. 20μ/m²·day·atm) 65% RH | Oxygen permeation (cc. 20μ/m²·day·atm) 100% RH | Young's modulus (kg/mm²) | Tensile strength (kg/mm²) | Tensile elongation at break (%) |
|---|---|---|---|---|---|---|---|
| Example 1 | 2.0 | 5.8 | 0.3 | 28 | 210 | 10 | 200 |
| Example 2 | 3.1 | 9.1 | 0.9 | 20 | 180 | 8 | 240 |
| Example 3 | 4.1 | 11 | 1.6 | 18 | 170 | 8 | 270 |
| Example 4 | 3.8 | 10 | 0.2 | 45 | 190 | 8 | 260 |
| Comp. Ex. 1 | 3.5 | 10 | 0.3 | 40 | 220 | 9 | 180 |
| Comp. Ex. 2 | 6.9 | 19 | 1.5 | 29 | 180 | 7 | 260 |
| Comp. Ex. 3 | >3000 | >3000 | 130 | 1500 | 100 | 4 | 250 |
| Comp. Ex. 4 | 50 | 150 | 0.2 | 100 | 180 | 8 | 280 |
| Comp. Ex. 5 | 600 | 1500 | 600 | 750 | 70 | 4 | 290 |
| Comp. Ex. 6 | >3000 | >3000 | 0.1 | 1500 | 200 | 7 | 250 |
| Comp. Ex. 7 | >3000 | >3000 | 0.1 | >3000 | 250 | 8 | 230 |

Note 1: Ethylene component content, saponification degree and syndiotacticity (mol %, diad convention) were measured by ¹H-NMR after dissolution in d₆-DMSO.

2: Melting point was measured by DSC (in nitrogen stream, temperature elevating rate: 10° C./min.).

3: $[\eta]$ was measured at 30° C. using a mixed solvent of 85 weight % of phenol and 15 weight % of water.

4: Oxygen permeability upon retorting shows a ratio of oxygen weight permeated into a cup formed by the method described in Example 1 upon hydrothermal treatment at 120° C. for a predetermined time, to water in the cup.

5: Oxygen permeation was measured after heat treating a monolayer film at 120° C. for 10 minutes and keeping same in 65% RH and 100% RH at 20° C.

6: Young's modulus, tensile strength and tensile elongation at break were measured after heat treating a monolayer film at 120° C. for 10 minutes and keeping same in 65% RH at 20° C.

The ethylene-vinyl alcohol copolymers of the invention show less decrease of resistance to gas permeation under high humidity, particularly high temperature and high humidity, while retaining the same degree of resistance to gas permeation under low humidity, transparency and melt moldability as compared with conventional EVOH.

What is claimed is:

1. An ethylene-vinyl alcohol copolymer, wherein ethylene content is 10–70 mol %, diad syndiotacticity is not less than 55 mol % and intrinsic viscosity [$\eta$] is not less than 0.05 l/g when measured with a mixed solvent of 85 weight % of phenol and 15 weight % of water at 30° C.

2. The ethylene-vinyl alcohol copolymer as claimed in claim 1, wherein the diad syndiotacticity is not less than 57 mol %.

3. The ethylene-vinyl alcohol copolymer as claimed in claim 1, wherein ethylene component content is 25–60 mol %.

4. The ethylene-vinyl alcohol copolymer as claimed in claim 1, wherein the intrinsic viscosity [$\eta$] is 0.06–0.5 l/g.

5. The ethylene-vinyl alcohol copolymer as claimed in claim 1, wherein the degree of saponification is not less than 80 mol %.

6. A molding formed of the ethylene-vinyl alcohol copolymer as claimed in claim 1.

7. A laminate comprising at least two layers of a layer of the ethylene-vinyl alcohol copolymer as claimed in claim 1 and a thermoplastic resin layer.

* * * * *